United States Patent
Nagayama et al.

(10) Patent No.: US 7,316,373 B2
(45) Date of Patent: Jan. 8, 2008

(54) DISENGAGE DEVICE FOR AIRCRAFT CONTROL

(75) Inventors: Takashi Nagayama, Tokyo (JP); Hiroshi Yoneda, Tokyo (JP); Kenshi Miyata, Tokyo (JP)

(73) Assignee: Fuji Jukogyo Kabushiki Kaisha (JP)

( * ) Notice: Subject to any disclaimer, the term of this patent is extended or adjusted under 35 U.S.C. 154(b) by 562 days.

(21) Appl. No.: 11/038,725

(22) Filed: Jan. 19, 2005

(65) Prior Publication Data

US 2005/0178926 A1 Aug. 18, 2005

(30) Foreign Application Priority Data

Jan. 21, 2004 (JP) ............................ 2004-013293

(51) Int. Cl.
*B64C 13/14* (2006.01)
(52) U.S. Cl. .................................... 244/224; 244/99.2
(58) Field of Classification Search ................ 244/224, 244/99.2, 232, 99.3, 99.9, 233, 223; 74/491, 74/503, 527
See application file for complete search history.

(56) References Cited

U.S. PATENT DOCUMENTS 5,042,749 A * 8/1991 Jacques et al. ............... 244/49

5,823,471 A * 10/1998 Dazet ........................ 244/99.3

OTHER PUBLICATIONS

Murayama, Daijiro, "Aeronautical Engineering Course," autopilot, Apr. 10, 1983, vol. 17, Japan Aeronautical Engineer's Association, Japan.

* cited by examiner

*Primary Examiner*—Timothy D. Collins
(74) *Attorney, Agent, or Firm*—Smith, Gambrell & Russell, LLP

(57) ABSTRACT

A disengage device in an aircraft, which prevents a driving force of a drive unit from transmitting to a control surface, having:

a first rod having one end portion connected to the drive unit, the other end portion, and a hollow portion formed to have a predetermined length and open at the other end portion;

a branch pipe which is connected to a side wall of the first rod and communicates with the hollow portion;

a second rod having one end portion connected to the push-pull rod, the other end portion, and a recess portion formed in a part of a side wall of a portion which extends a predetermined length from the other end portion to the one end portion side and is inserted in the hollow portion; and an engaging member arranged to be freely movable in the branch pipe, which is engagable with the recess portion.

11 Claims, 3 Drawing Sheets

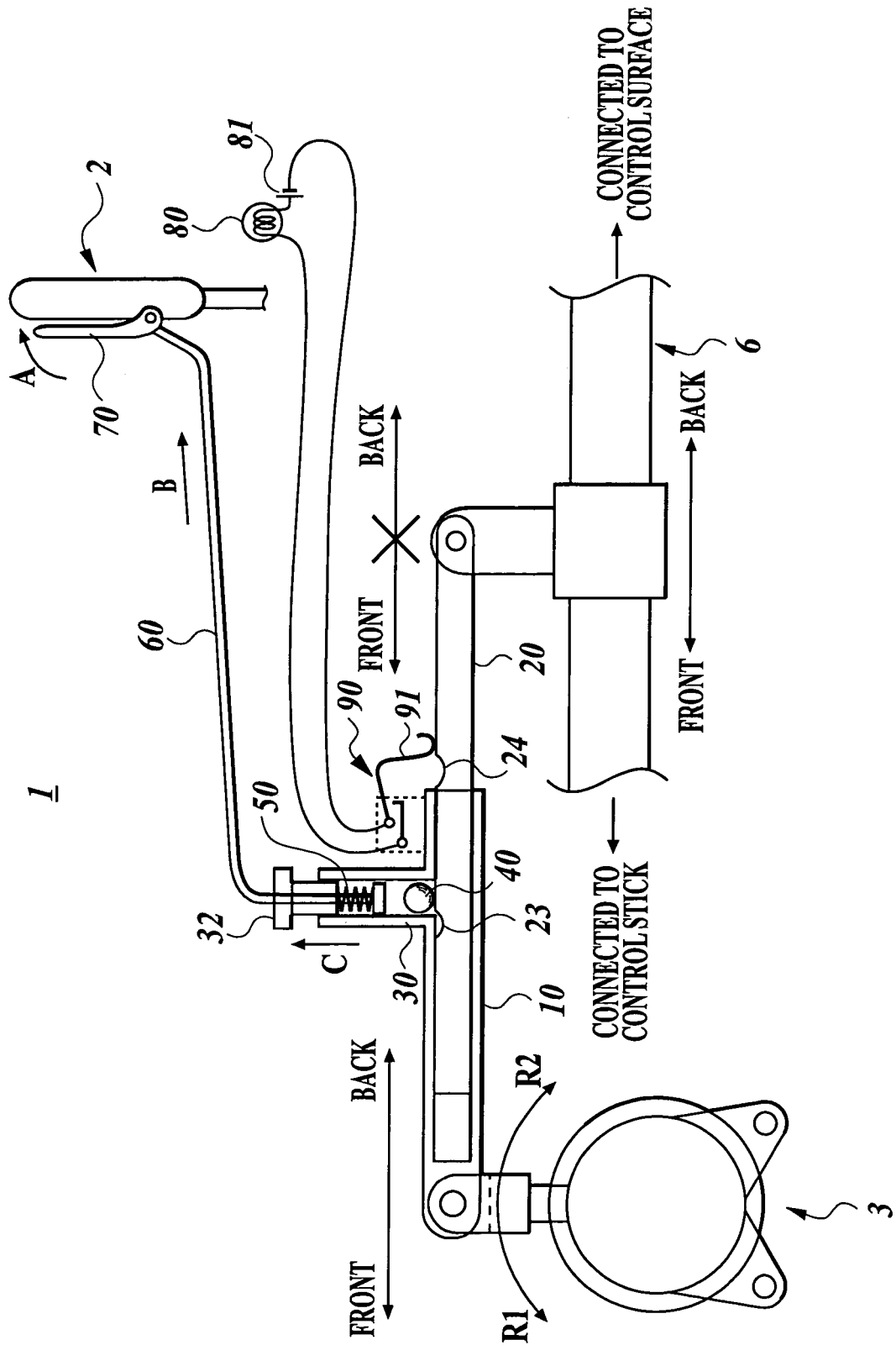

DISENGAGE DEVICE FOR AIRCRAFT CONTROL

BACKGROUND OF THE INVENTION

1. Field of the Invention

The present invention relates to a disengage device and particularly, to a disengage device which is used in an automatic pilot system in an aircraft and blocks a transmission of a steering force (driving force of a control surface).

2. Description of the Related Art

Currently, an automatic pilot (autopilot) device has been put to practical use, which realizes a flight along a predetermined path by automatically driving and controlling the control surface of an aircraft. The automatic pilot system is provided with a drive unit such as a servomotor or the like for driving the control surface, and a control unit for controlling the drive unit, however, there is a case where the drive unit or the control unit fails and generates an inappropriate driving force. To handle such situation, there is proposed a "disengage device" which prevents the driving force of the drive unit from transmitting to the control surface.

As an earlier developed disengage device, as shown in FIG. 3, an electromagnetic clutch type disengage device in which an electromagnetic clutch 300 actuated by electromagnetic force is provided between a servomotor 100 as a drive unit and an output shaft 200 for transmitting the driving force from the servomotor 100 to the control surface has been proposed (for example, refer to "Aeronautical Engineering Course, Vol. 17, autopilot" by Daijiro Murayama, published by Japan Aeronautical Engineer's Association, page 83-84, Apr. 10, 1983). In this disengage device, a rotation torque (driving force) from the servomotor 100 is transmitted to the output shaft 200, whereas the transmission of the rotation torque is blocked by disengaging a friction plate of the electromagnetic clutch 300.

However, the electromagnetic clutch type disengage device utilizes electromagnetic force, so that a power supply for supplying electricity needs to be provided. Therefore, the operation may stop not only when the disengage device itself breaks down, but also when electrical supply is interrupted due to the electric system failure, thus having a relatively low reliability. Since the size and the weight of the friction plate forming the electromagnetic clutch are large, the device becomes large and the weight thereof increases.

The electromagnetic clutch type disengage device is for preventing the transmission of the rotation movement of the servomotor, so that it is not directly applied to a "manual type" control system in which the operation amount of a control stick is transmitted to the control surface by using a push-pull rod.

The electromagnetic clutch transmits the driving force irrespective to the phases of the drive side (servomotor) and the driven side (output shaft), so that a rotation position of the servomotor does not corresponds to the position of the control stick in automatic pilot in one-to-one relation. Accordingly, a device for corresponding the rotation position of the servomotor to the position of the control stick in one-to-one relation needs to be separately provided so that the control state can be recognized from the position of the control stick in automatic pilot.

An object of the present invention is to provide a disengage device which can be applied to a "manual type" control system using a push-pull rod, requiring no electricity, and has high reliability.

SUMMARY OF THE INVENTION

For solving the problems, in accordance with a first aspect of the present invention, the disengage device mounted in an aircraft having a control stick, a control surface, a drive unit to drive the control surface, and a push-pull rod to transmit a driving force of the drive unit or an operation input transmitted through the control stick to the control surface, which prevents the driving force of the drive unit from transmitting to the control surface, comprises:

a first rod comprising one end portion of the first rod which is connected to the drive unit, the other end portion of the first rod, and a hollow portion formed to have a predetermined length and open at the other end portion of the first rod;

a branch pipe which is connected to a side wall of the first rod and an inside of which communicates with the hollow portion;

a second rod comprising one end portion of the second rod connected to the push-pull rod, the other end portion of the second rod, and a recess portion formed in a part of a side wall of a portion which extends a predetermined length from the other end portion of the second rod to the one end portion side of the second rod and is inserted in the hollow portion of the first rod; and an engaging member which is arranged to be freely movable in the branch pipe, and is engagable with the recess portion.

Accordingly, the second rod is inserted into the hollow portion of the first rod, the engaging member arranged in the branch pipe which is connected to the first rod is engaged with the recess portion, so that the first rod and the second rod can be in the engagement state. Accordingly, the first rod can interlock with the second rod, so that the driving force of the drive unit transmitted to the first rod can be transmitted to the control surface through the second rod and the push-pull rod.

Accordingly, an engaging member is arranged to be freely movable in the branch pipe, so that the engagement state of the both of the recess portion and the engaging member can be released by moving the engaging member which engages with the recess portion, thereby realizing the state (disengagement state) where the second rod can freely move in the hollow portion of the first rod. Thus, the driving force of the drive unit transmitted to the first rod is prevented from transmitting to the second rod. Consequently, the transition to the control by the control stick (manual control) can be performed.

As above, the disengage device according to the present invention is successful in realizing a desired disengagement state without requiring electricity, so that there is no need to consider the operation stop due to the failure of the electric system such as an earlier developed electromagnetic clutch type disengage device, thus, enabling to have high reliability. Since a power supply or an electromagnetic clutch (friction plate) is not used, downsizing and weight saving of the device can be realized.

Moreover, accordingly, the engaging member in the branch pipe connected to the first rod is engaged with the recess portion of the second rod, so that the positional relationship of the first rod and the second rod can be held constant while realizing the engagement state of both rods. Thus, the position of the drive unit connected to the first rod can correspond to the position of the control surface connected to the second rod through the push-pull rod in one-to-one relation. Accordingly, a device for corresponding the position of the drive unit to the position of the control stick does not need to be separately provided.

Preferably, the disengage device further comprises:

an elastic member to maintain an engagement state of the engaging member and the recess portion by generating a biasing force to push the engaging member to the recess portion; and an engagement releasing section which reduces the biasing force of the elastic member to release the engagement state of the engaging member and the recess portion.

Accordingly, by pushing the engaging member to the recess portion with the biasing force of the elastic member to hold the engagement state of both of the engaging member and the recess portion, the engagement state of the first rod and the second rod can be stable. The biasing force of the elastic member is reduced by the engagement releasing section, so that the engagement state of the engaging member and the recess portion can be released, thereby easily realizing the disengagement state. When there is a failure in the engagement releasing section, the pilot of the aircraft forcibly changes the relative position of the second rod to the first rod by operating the control stick, so that the engaging member engaged with the recess portion of the second rod is pushed upward against the biasing force of the elastic member to release the engagement state, thereby certainly realizing the disengagement state.

Preferably, the disengage device further comprises, a biasing force adjusting section to adjust the biasing force of the elastic member.

Accordingly, since the biasing force adjusting section for adjusting the biasing force of the elastic member is provided, so that the force needed to release the engagement state of the elastic member and the recess portion (transition to the disengagement state) can be adjusted.

Preferably, the engagement releasing section comprises a push-pull cable connected to the elastic member, and a disengage lever to apply a predetermined tension by an operation thereof to reduce the biasing force of the elastic member.

Preferably, the engaging member is formed into a spherical body.

Accordingly, since the engaging member is the spherical body, it can freely roll in the branch pipe and the recess portion. Thus, when the relative position of the second rod to the first rod is changed by operating the control stick, the engaging member (spherical body) is easily separated from the recess portion. Accordingly, the release of the engagement state by the operation of the control stick (transition to the disengagement state) can be easily realized.

Preferably, the disengage device further comprises, an engagement state indication section to indicate whether the first rod and the second rod are in an engagement state or not.

Accordingly, since the engagement state indication section to indicate whether the first rod and the second rod are in the engagement state or not is provided, a pilot of an aircraft can visually recognize that whether the state has changed from the engagement state to the disengagement state or vice versa.

According to the present invention, by engaging the engaging member in the branch pipe connected to the first rod with the recess portion of the second rod, the engagement state of the first rod and the second rod can be realized to transmit the driving force of the drive unit to the push-pull rod. The engaging member engaged with the recess portion is moved to release the engagement state of both of the engaging member and the recess portion, so that the disengagement state can be realized.

Accordingly, the disengage device of the present invention does not need to consider the operation stop due to the failure of the electric system such as an earlier developed electromagnetic clutch type disengage device, thus, enabling to have high reliability. Since a power supply or an electromagnetic clutch (friction plate) is not used, downsizing and weight saving of the device can be realized. Further, the position of the drive unit connected to the first rod can correspond to the position of the control surface connected to the second rod through the push-pull rod in one-to-one relation. Accordingly, a device for corresponding the position of the drive unit to the position of the control stick does not need to be separately provided.

BRIEF DESCRIPTION OF THE DRAWINGS

The present invention will become more fully understood from the detailed description given hereinafter and the accompanying drawings which are given by way of illustration only, and thus are not intended as a definition of the limits of the present invention, and wherein;

FIG. 2 is an explanation view showing the disengage device according to the embodiment of the present invention (disengagement state)

DETAILED DESCRIPTION OF THE PREFERRED EMBODIMENTS

Figure 1A:
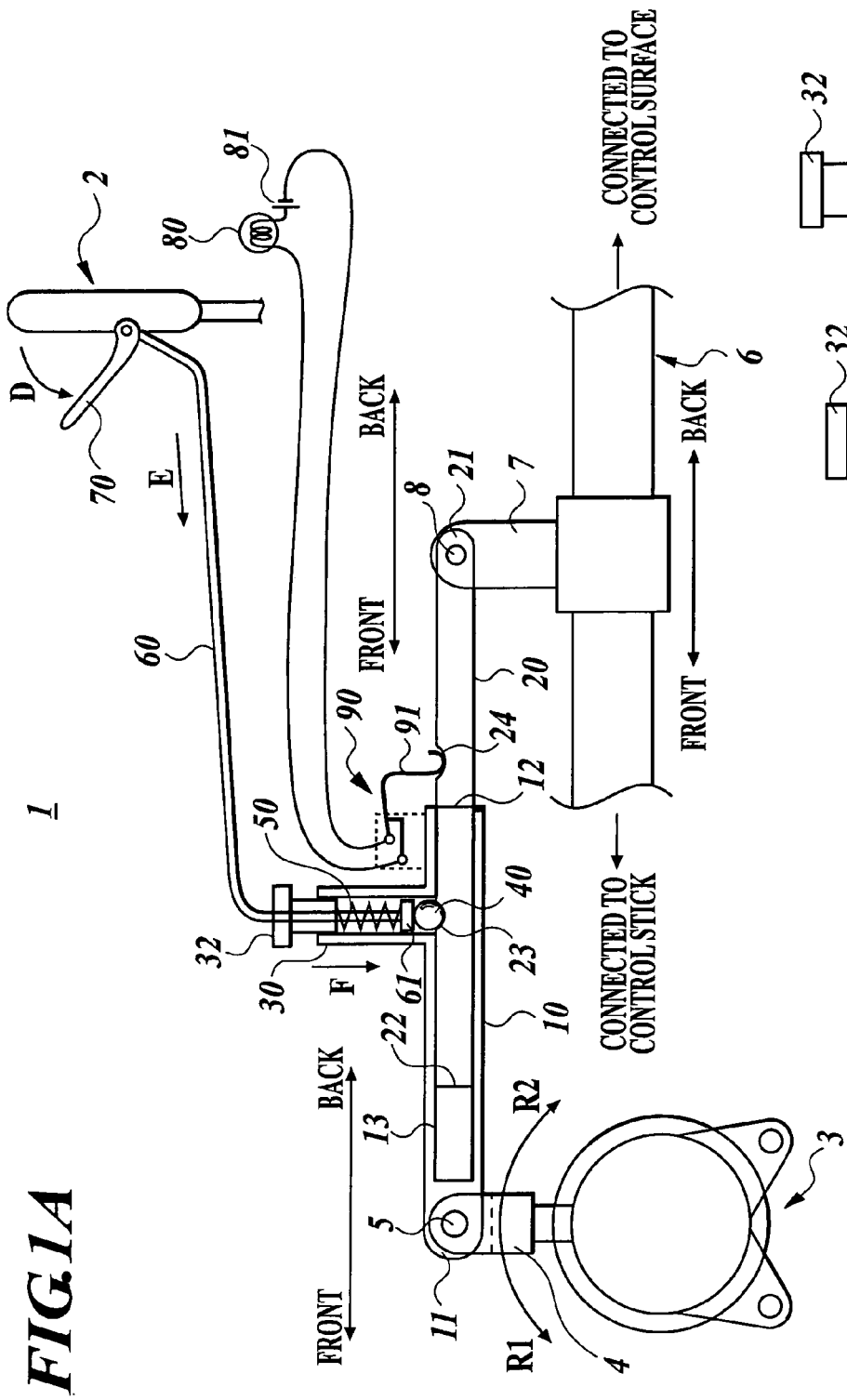
FIG. 1A is an explanation view showing a disengage device according to the embodiment of the present invention (engagement state)

The embodiment of the present invention will be explained below referring to the drawings.

A disengage device 1 according to the embodiment shown in FIG. 1A is mounted in an aircraft which comprises a control stick 2, a control surface which is not shown, a servomotor 3 for driving the control surface, a push-pull rod 6 for transmitting a driving force or an operation input transmitted through the control stick 2 to the control surface, and the like (that is, the aircraft comprising a "manual type" control system). The servomotor 3 as a drive unit rotates in directions of an arrow $R_1$ and an arrow $R_2$ in FIG. 1A.

The rotation movement of the servomotor 3 is transmitted to the push-pull rod 6 through a first rod 10 and a second rod 20 forming the disengage device 1, so that the push-pull rod 6 performs a reciprocating movement back and forth, thereby actuating the control surface. The disengage device 1 according to the embodiment prevents the transmission of the driving force of the servomotor 3 to the control surface.

The explanation of the configuration of the disengage device 1 according to the embodiment will be made referring to FIGS. 1A to 2.

As shown in FIGS. 1A to 2, the disengage device 1 comprises the first rod 10 and the second rod 20 for transmitting the driving force of the servomotor 3 to the push-pull rod 6, a cylindrical branch pipe 30 which is connected to a portion of the side wall of the first rod 10 at a right angle, a spherical body 40 and an elastic member 50 arranged in the branch pipe 30, a push-pull cable 60, a disengage lever 70, an engage indication lamp 80 and the like.

One end portion 11 of the first rod 10 is, as shown in FIG. 1A, rotatably connected to a drive arm 4 which is rotated in directions of the arrow $R_1$ and the arrow $R_2$ by the driving force of the servomotor 3 through a pin 5. Thus, when the drive arm 4 is rotated in the direction of the arrow $R_1$, the first rod 10 moves forward, and on the other hand, when the drive arm 4 is rotated in the direction of the arrow $R_2$, the first rod 10 moves backward. As shown in FIG. 1A, there is formed a hollow portion 13 with a predetermined length which extends from the other end portion 12 to the one end portion 11 side in the first rod 10. A portion of the second rod 20 is inserted in the hollow portion 13.

One end portion 21 of the second rod 20 is, as shown in FIG. 1A, rotatably connected to a driven arm 7 which is fixed to the push-pull rod 6 through a pin 8. Thus, when the second rod 20 moves forward due to the transmission of the driving force of the servomotor 3 through the first rod 10, the driven arm 7 and the push-pull rod 6 move forward. On the other hand, when the second rod 20 moves backward, the driven arm 7 and the push-pull rod 6 also move backward.

A portion having a predetermined length which extends from the other end 22 of the second rod 20 toward the one end portion 21 side is, as shown in FIG. 1A, inserted into the hollow portion 13 of the first rod 10. A recess portion 23 is formed at a predetermined point of this inserted portion. The recess portion 23 is formed to have a round shape to correspond to a portion of the spherical shape of the spherical body 40, so that the spherical body 40 disposed in the branch pipe 30 is engaged with the recess portion 23. In this embodiment, the depth size of the recess portion 23 is set to be about one third of the diameter of the spherical body 40.

The branch pipe 30, as shown in FIG. 1A, extends in a direction perpendicular to the length direction of the first rod 10, and is connected to a portion of the side wall of the first rod 10 to communicate with the hollow portion 13 of the first rod 10. That is, the branch pipe 30 and the first rod 10 are connected with each other at the hollow portion thereof.

Figure 1B:
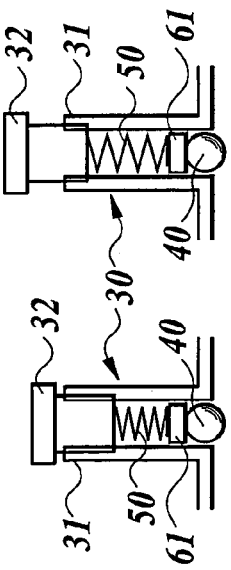
FIG. 1B is an explanation view for explaining a screw which adjusts a biasing force of an elastic member of the disengage device shown in FIG. 1A.
Figure 3:
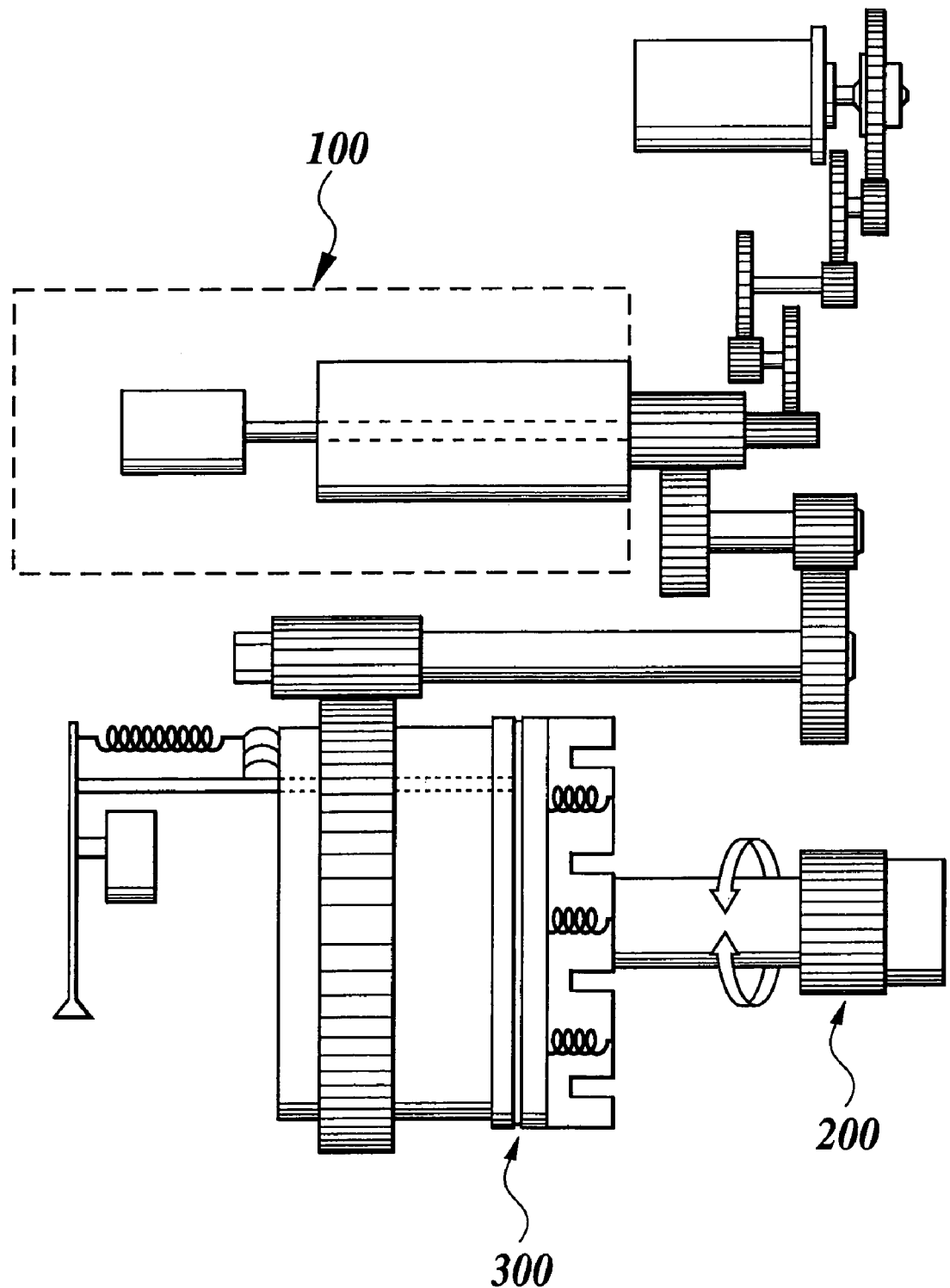
FIG. 3 is an explanation view for explaining an earlier developed disengage device.

As shown in FIG. 1A, the spherical body 40 is an engaging member in the present invention, which is engaged with the recess portion 23 of the second rod 20. The elastic member 50 is, as shown in FIG. 1B, arranged above the spherical body 40, and generates a biasing force to push the spherical body 40 to the second rod 20 side so that the engagement state of the spherical body 40 and the recess portion 23 can be held. In the embodiment, a "spring" is adapted as the elastic member 50.

A relative position of the second rod 20 to the first rod 10 is adjusted to position the recess portion 23 of the second rod 20 to the branch pipe 30 connected to the first rod 10 as shown in FIG. 1A, so that the spherical body 40 in the branch pipe 30 is engaged with the recess portion 23. Further, the spherical body 40 is pushed to the recess portion 23 side by the biasing force of the elastic member 50, so that the relative movement of the second rod 20 to the first rod 10 in back and forth direction can be prevented (hereinafter, referred to as an engagement state). Realizing such engagement state can transmit the driving force of the servomotor 3 to the push-pull rod 6 through the first rod 10 and the second rod 20.

A tip portion 31 of the branch pipe 30 is threaded on the inside wall, and a screw 32 is screwed in the tip portion 31 as shown in FIG. 1B. The lower end of the screw 32 contacts with the elastic member 50 arranged in the branch pipe 30. The screw 32 is screwed in the tip portion 31 a predetermined length to push the elastic member 50 downward to thereby generate a biasing force. The biasing force of the elastic member 50 applied to the spherical body 40 can be adjusted by changing the length to screw in the screw 32. That is, the screw 32 is a biasing force adjusting section in the present invention.

The push-pull cable 60 and the disengaging lever 70 form an engagement releasing section in the present invention to reduce the biasing force of the elastic member 50. One end portion of the push-pull cable 60 is arranged near the control stick 2 to be connected to the disengage lever 70, and the other end portion thereof is inserted into the branch pipe 30 to be connected to a disk shaped push-up member 61 which contacts with the spherical body 40. A predetermined tension is added to the push-pull cable 60 by the operation of the disengage lever 70 to pull up the push-up member 61, thereby reducing the biasing force of the elastic member 50. This results in releasing the engagement state of the spherical body 40 and the recess portion 23.

The other end portion of the push-pull cable 60 is, as shown in FIG. 1A, inserted into the inserting hole provided on the screw 32 to be inserted into the branch pipe 30, and reaches the lower portion of the elastic member 50. The push-up member 61 which is attached to the end portion of the push-pull cable 60 is pulled up by the push-pull cable 60 when pulling the disengage lever 70, so that the lower portion of the elastic member 50 is pushed upward, thereby reducing the biasing force acting in the spherical body 40.

When releasing the engagement state of the spherical body 40 and the recess portion 23, the disengage lever 70 is operated in an arrow A direction in FIG. 2 to pull the push-pull cable 60 in an arrow B direction, so that the push-up member 61 is moved in an arrow C direction (upward), thereby reducing the biasing force of the elastic member 50. On the other hand, when engaging the spherical body 40 with the recess portion 23, the disengage lever 70 is operated in an arrow D direction in FIG. 1A to return the push-pull cable 60 in an arrow E direction, thereby moving the push-up member 61 in an arrow F direction (downward).

The engage indication lamp 80 is an engagement state indication section in the present invention, and lights up when the first rod 10 and the second rod 20 are in the engagement state. The engagement indication lamp 80 is, as shown in FIG. 1A, incorporated in a series circuit comprising a limit switch 90 for supplying and interrupting the electricity supplied from a battery 81.

The limit switch 90 is, as shown in FIG. 1A, provided near the end portion 12 of the first rod 10, and when the first rod 10 and the second rod 20 are in the engagement state, a terminal 91 of the limit switch 90 engages with a recess portion 24 of the second rod 20. In the state where the terminal 91 engages with the recess 24, the electricity supplied from the battery 81 flows in the circuit, so that the engagement indication lamp 80 lights up.

On the other hand, when the relative position of the second rod 20 to the first rod 10 in back and forth direction is changed to be the disengagement state as shown in FIG. 2, the terminal 91 of the limit switch 90 is separated from the recess portion 24. In the state where the terminal 91 is separated from the recess portion 24, the electricity supplied from the battery 81 is interrupted, thus the light of the engagement indication lamp 80 goes out.

Next, a disengage method by using the disengage device 1 according to the embodiment will be explained.

When an airplane is in automatic pilot, the first rod 10 and the second rod 20 of the disengage device 1 are in the engagement state (refer to FIG. 1A), and the driving force of the servomotor 3 is transmitted to the push-pull rod 6 through the drive arm 4, the first rod 10, the second rod 20 and the driven arm 7 to drive the control surface. In automatic pilot, the engagement indication lamp 80 lights up.

In the automatic pilot, in a case of an emergency such as a failure of the servomotor 3 or the control unit, a pilot of an aircraft actuates the disengage device 1 to switch to manual pilot mode.

That is, the pilot of the aircraft, as shown in FIG. 2, operates the disengage lever 70 in the arrow A direction to pull the push-pull cable 60 in the arrow B direction, thereby pushing up the elastic member 50 in the branch pipe 30 in the arrow C direction (upward). Then, the biasing force of the elastic member 50 pushing the spherical body 40 to the recess portion 23 of the second rod 20 is reduced. When the servomotor 3 is driven in this state and the first rod 10 relatively moves in back and forth direction with respect to the second rod 20, the spherical body 40 in the branch pipe 30 is pushed upward by the wall surface of the recess portion 23, thus, the engagement state of the spherical body 40 and the recess portion 23 is released.

When the engagement state of the spherical body 40 and the recess portion 23 is released as above, the driving force of the servomotor 3 is not transmitted to the second rod 20. Thus, the push-pull rod 6 is adopted to be driven by the operation input by the pilot transmitted through the control stick 2, not by the driving force of the servomotor 3. Moreover, when the engagement state of the spherical body 40 and the recess portion 23 is released, and the relative position of the second rod 20 to the first rod 10 in back and forth direction changes, the terminal 91 of the limit switch 90 is separated from the recess portion 24, thus the light of the engagement indication lamp 80 goes out.

When there is a failure in the push-pull cable 60 or the disengage lever 70, the pilot of the aircraft forcibly changes the relative position of the second rod 20 to the first rod 10 by operating the control stick 2 with relatively a strong power. The spherical body 40 engaged with the recess portion 23 of the second rod 20 is pushed upward against the biasing force of the elastic member 50 by this operation to forcibly release the engagement state, thereby realizing the disengagement state.

According to the disengage device 1 of the above explained embodiment, the second rod 20 is inserted into the hollow portion 13 of the first rod 10, the spherical body 40 arranged in the branch pipe 30 which is connected to the first rod 10 is engaged with the recess portion 23, and the spherical body 40 is pushed to the recess portion 23 by the biasing force of the elastic member 50, so that the first rod 10 and the second rod 20 can be in the engagement state (refer to FIG. 1A). Accordingly, the first rod 10 can interlock with the second rod 20, so that the driving force of the servomotor 3 transmitted to the first rod 10 can be transmitted to the control surface through the second rod 20 and the push-pull rod 6.

The push-pull cable 60 and the disengage lever 70 reduce the biasing force of the elastic member 50, so that the engagement state of the spherical body 40 and the recess portion 23 can be released, thereby realizing the state (disengagement state) where the second rod 20 can freely move in the hollow portion 13 of the first rod 10 (refer to FIG. 2). Accordingly, the driving force of the servomotor 3 transmitted to the first rod 10 is prevented from transmitting to the second rod 20. Consequently, the pilot can operates the aircraft with the control stick 2 (manual control).

Even when there is a failure in the push-pull cable 60 or the disengage lever 70, the relative position of the second rod 20 to the first rod 10 is forcibly changed by operating the control stick 2, so that the spherical body 40 engaged with the recess portion 23 of the second rod 20 can be pushed up against the biasing force of the elastic member 50 to forcibly release the engagement state, thereby realizing the disengagement state.

As above, the disengage device 1 according to the embodiment is successful in realizing a desired disengagement state without requiring electricity, so that there is no need to consider the operation stop due to the failure of the electric system such as an earlier developed electromagnetic clutch type disengage device, enabling to have high reliability. Since a power supply or an electromagnetic clutch (friction plate) is not used, downsizing and weight saving of the device can be realized.

Further, in the disengage device 1 according to the embodiment explained above, the spherical body 40 in the branch pipe 30 connected to the first rod 10 is engaged with the recess portion 23 of the second rod 20, so that the positional relationship of the first rod 10 and the second rod 20 can be held constant while realizing the engagement state of both rods. Thus, a rotation position of the servomotor 3 connected to the first rod 10 can correspond to the position of the control stick 2 connected to the second rod 20 through the push-pull rod 6 in one-to-one relation. Accordingly, a device for corresponding the rotation position of the servomotor 3 to the position of the control stick 2 does not need to be separately provided.

Further, in the disengage device 1 according to the embodiment explained above, the spherical body 40 is adopted as an engaging member, which can roll in the branch pipe 30 and in the recess portion 23. Thus, when the relative position of the second rod 20 to the first rod 10 is changed by operating the control stick 2, the spherical body 40 as an engaging member is easily separated from the recess portion 23. Accordingly, the release of the engagement state by the operation of the control stick 2 (transition to the disengagement state) can be easily realized.

Further, the disengage device 1 according to the embodiment explained above comprises the screw 32 for adjusting the biasing force of the elastic member 50, so that the force needed to release the engagement state of the spherical body 40 and the recess portion 23 (transition to the disengagement state) can be adjusted.

Further, the disengage device 1 according to the embodiment explained above comprises the engagement indication lamp 80 which lights up when the first rod 10 and the second rod 20 are in the engagement state, so that a pilot of an aircraft can visually recognize that whether the state has changed from the engagement state to the disengagement state or vice versa.

In the above embodiment, the spherical body 40 is adopted as an example of the engaging member in the present invention, and also the recess portion 23 having a round shape to correspond to a portion of the spherical shape of the spherical body 40 is adopted. However, the shape of the engaging member and the recess portion is not limited thereto.

In the above embodiment, the push-pull cable 60 and the disengage lever 70 are adopted as the engagement releasing section in the present invention, however, any configuration may be adopted as long as the biasing force of the elastic member 50 in the branch pipe 30 is reduced to release the engagement state of the spherical body 40 and the recess portion 23.

In the above embodiment, the example was made in which only the limit switch 90 which turns off the engagement indication lamp 80 when the relative position of the second rod 20 to the first rod 10 changes is adopted, however, a limit switch which turns off the engagement indication lamp 80 by interrupting the electricity supplied from the battery 81 when the disengage lever 70 is operated in the arrow A direction may be added.

In the above embodiment, the engagement indication lamp 80 is adopted as an example of the engagement state indication section in the present invention, however, a buzzer which outputs sound when the first rod 10 and the second rod 20 are in the engagement state may also be adopted as the engagement state indication section.

The entire disclosure of Japanese Patent Application No. Tokugan 2004-013293 which was filed on Jan. 21, 2004, including specification, claims, drawings and summary are incorporated herein by reference in its entirety.

What is claimed is:

1. A disengage device mounted in an aircraft having a control stick, a control surface, a drive unit to drive the control surface, and a push-pull rod to transmit a driving force of the drive unit or an operation input transmitted through the control stick to the control surface, which prevents the driving force of the drive unit from transmitting to the control surface, comprising:
    a first rod comprising one end portion of the first rod which is connected to the drive unit, the other end portion of the first rod, and a hollow portion formed to have a predetermined length and open at the other end portion of the first rod;
    a branch pipe which is connected to a side wall of the first rod and an inside of which communicates with the hollow portion;
    a second rod comprising one end portion of the second rod connected to the push-pull rod, the other end portion of the second rod, and a recess portion formed in a part of a side wall of a portion which extends a predetermined length from the other end portion of the second rod to the one end portion side of the second rod and is inserted in the hollow portion of the first rod; and
    an engaging member which is arranged to be freely movable in the branch pipe, and is engagable with the recess portion.

2. The disengage device as claimed in claim 1, further comprising,
    an elastic member to maintain an engagement state of the engaging member and the recess portion by generating a biasing force to push the engaging member to the recess portion; and
    an engagement releasing section which reduces the biasing force of the elastic member to release the engagement state of the engaging member and the recess portion.

3. The disengage device as claimed in claim 2, further comprising, a biasing force adjusting section to adjust the biasing force of the elastic member.

4. The disengage device as claimed in claim 2, wherein, the engagement releasing section comprises a push-pull cable connected to the elastic member, and a disengage lever to apply a predetermined tension by an operation thereof to reduce the biasing force of the elastic member.

5. The disengage device as claimed in claim 3, wherein, the engagement releasing section comprises a push-pull cable connected to the elastic member, and a disengage lever to apply a predetermined tension by an operation thereof to reduce the biasing force of the elastic member.

6. The disengage device as claimed in claim 1, wherein, the engaging member is formed into a spherical body.

7. The disengage device as claimed in claim 1, further comprising, an engagement state indication section to indicate whether the first rod and the second rod are in an engagement state or not.

8. The disengage device as claimed in claim 7, wherein the engagement state indication section comprises a lamp.

9. The disengage device as claimed in claim 8, further comprising a limit switch to control the lamp to light up or go out.

10. The disengage device as claimed in claim 7, wherein the engagement indication section comprises a buzzer.

11. The disengage device as claimed in claim 2, wherein the elastic member comprises a spring.

* * * * *